United States Patent
Mossakowski

(10) Patent No.: US 7,130,347 B2
(45) Date of Patent: Oct. 31, 2006

(54) METHOD FOR COMPRESSING AND DECOMPRESSING VIDEO DATA IN ACCORDANCE WITH A PRIORITY ARRAY

(75) Inventor: Gerd Mossakowski, Ahlen (DE)

(73) Assignee: T-Mobile Deutschland GmbH, Bonn (DE)

( * ) Notice: Subject to any disclaimer, the term of this patent is extended or adjusted under 35 U.S.C. 154(b) by 447 days.

(21) Appl. No.: 10/472,539

(22) PCT Filed: Mar. 19, 2002

(86) PCT No.: PCT/DE02/00987

§ 371 (c)(1),
(2), (4) Date: Nov. 13, 2003

(87) PCT Pub. No.: WO02/078352

PCT Pub. Date: Oct. 3, 2002

(65) Prior Publication Data

US 2004/0095996 A1    May 20, 2004

(30) Foreign Application Priority Data

Mar. 21, 2001 (DE) .............................. 101 13 880

(51) Int. Cl.
*H04N 7/12* (2006.01)
(52) U.S. Cl. .................................................. 375/240.01
(58) Field of Classification Search ........... 375/240.01, 375/240.08, 240.21, 240.23, 240.24, 240.26; 382/232, 245; *H04N 7/12*
See application file for complete search history.

(56) References Cited

U.S. PATENT DOCUMENTS 5,647,024 A    7/1997    Kawauchi et al. .......... 382/232
5,675,669 A    10/1997   Kim .......................... 382/241

FOREIGN PATENT DOCUMENTS

| DE | 195 41 457 | 7/1997 |
| DE | 692 26 825 | 3/1999 |
| DE | 693 24 538 | 10/1999 |
| DE | 694 25 047 | 10/2000 |
| DE | 695 19 462 | 6/2001 |
| DE | 696 10 987 | 5/2004 |

(Continued)

OTHER PUBLICATIONS

Simon S.: "Generalized run-length coding for SNR-scalable image compression", 7th European Signal Processing Conference, Sep. 1994.

(Continued)

*Primary Examiner*—Young Lee
(74) *Attorney, Agent, or Firm*—Baker & Daniels

(57) ABSTRACT

A method for compressing and decompressing video data consisting of an array of individual image points (pixels). Each pixel has a pixel value that changes with time and that describes the colour or luminosity information of the pixel. A priority is allocated to each pixel and the pixels are then stored in a priority array according to this priority allocation. The array contains at each moment in time the pixel values that have been classified according to the priority allocation. The pixels and the pixel values that have been used to calculate the priority allocation are transmitted or saved according to the priority allocation. A pixel receives a high priority if the differences in relation to its neighbouring pixel are great. For the reconstruction process, the current pixel values in each case are reproduced on the display. The pixels that have not yet been transmitted are calculated from the pixels that have already been transmitted

14 Claims, 4 Drawing Sheets

FOREIGN PATENT DOCUMENTS

JP          05 244435       12/1993

OTHER PUBLICATIONS

Carlsson, S.: "Sketch Based Coding of Grey Level Images", Signal Processing, European Journal Devoted to the Methods and Applications of Signal Processing, Jul. 1988, pp. 57-83.

Yan, J.K. et al.: "Encoding of Images Based on a Two-Component Source Model", IEEE Transactions on Communications, IEEE, Inc., Nov. 1977, pp. 1315-1322.

Kunt, M. et al.: "Second-Generation Image-Coding Techniques", Proceedings of the IEEE, Apr. 1985, pp. 549-574.

Chee, Y.K.: "Survey of Progressive Image Transmission Methods", International Journal of Imaging Systems and Technology, 1999, pp. 3-19.

Bell, D.M. et al.: Progressive Technique for Human Face Archiving and Retrieval:, Journal of Electronic Imaging, Apr. 1996, pp. 191-197.

Marshall, S.: "Application of Image Contours to Three Aspects of Imaging Processing: Compression, Shape Recognition and Stereopsis", IEE Proceedings, Feb. 1992.

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 20 | 21 | 22 | 23 | 24 | 25 | 26 | 27 | 28 | 29 | 30 | 31 | 32 | 33 | 34 | 35 | 36 | 37 | 38 | 39 |
| 40 | 41 | 42 | 43 | 44 | 45 | 46 | 47 | 48 | 49 | 50 | 51 | 52 | 53 | 54 | 55 | 56 | 57 | 58 | 59 |
| 60 | 61 | 62 | 63 | 64 | 65 | 66 | 67 | 68 | 69 | 70 | 71 | 72 | 73 | 74 | 75 | 76 | 77 | 78 | 79 |
| 80 | 81 | 82 | 83 | 84 | 85 | 86 | 87 | 88 | 89 | 90 | 91 | 92 | 93 | 94 | 95 | 96 | 97 | 98 | 99 |
| 100 | 101 | 102 | 103 | 104 | 105 | 106 | 107 | 108 | 109 | 110 | 111 | 112 | 113 | 114 | 115 | 116 | 117 | 118 | 119 |
| 120 | 121 | 122 | 123 | 124 | 125 | 126 | 127 | 128 | 129 | 130 | 131 | 132 | 133 | 134 | 135 | 136 | 137 | 138 | 139 |
| 140 | 141 | 142 | 143 | 144 | 145 | 146 | 147 | 148 | 149 | 150 | 151 | 152 | 153 | 154 | 155 | 156 | 157 | 158 | 159 |
| 160 | 161 | 162 | 163 | 164 | 165 | 166 | 167 | 168 | 169 | 170 | 171 | 172 | 173 | 174 | 175 | 176 | 177 | 178 | 179 |
| 180 | 181 | 182 | 183 | 184 | 185 | 186 | 187 | 188 | 189 | 190 | 191 | 192 | 193 | 194 | 195 | 196 | 197 | 198 | 199 |
| 200 | 201 | 202 | 203 | 204 | 205 | 206 | 207 | 208 | 209 | 210 | 211 | 212 | 213 | 214 | 215 | 216 | 217 | 218 | 219 |
| 220 | 221 | 222 | 223 | 224 | 225 | 226 | 227 | 228 | 229 | 230 | 231 | 232 | 233 | 234 | 235 | 236 | 237 | 238 | 239 |
| 240 | 241 | 242 | 243 | 244 | 245 | 246 | 247 | 248 | 249 | 250 | 251 | 252 | 253 | 254 | 255 | 256 | 257 | 258 | 259 |
| 260 | 261 | 262 | 263 | 264 | 265 | 266 | 267 | 268 | 269 | 270 | 271 | 272 | 273 | 274 | 275 | 276 | 277 | 278 | 279 |
| 280 | 281 | 282 | 283 | 284 | 285 | 286 | 287 | 288 | 289 | 290 | 291 | 292 | 293 | 294 | 295 | 296 | 297 | 298 | 299 |
| 300 | 301 | 302 | 303 | 304 | 305 | 306 | 307 | 308 | 309 | 310 | 311 | 312 | 313 | 314 | 315 | 316 | 317 | 318 | 319 |
| 320 | 321 | 322 | 323 | 324 | 325 | 326 | 327 | 328 | 329 | 330 | 331 | 332 | 333 | 334 | 335 | 336 | 337 | 338 | 339 |
| 340 | 341 | 342 | 343 | 344 | 345 | 346 | 347 | 348 | 349 | 350 | 351 | 352 | 353 | 354 | 355 | 356 | 357 | 358 | 359 |
| 360 | 361 | 362 | 363 | 364 | 365 | 366 | 367 | 368 | 369 | 370 | 371 | 372 | 373 | 374 | 375 | 376 | 377 | 378 | 379 |
| 380 | 381 | 382 | 383 | 384 | 385 | 386 | 387 | 388 | 389 | 390 | 391 | 392 | 393 | 394 | 395 | 396 | 397 | 398 | 399 |
| 400 | 401 | 402 | 403 | 404 | 405 | 406 | 407 | 408 | 409 | 410 | 411 | 412 | 413 | 414 | 415 | 416 | 417 | 418 | 419 |

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|----|----|----|----|----|----|----|----|----|----|
| 20 | 21 | 22 | 23 | 24 | 25 | 26 | 27 | 28 | 29 | 30 | 31 | 32 | 33 | 34 | 35 | 36 | 37 | 38 | 39 |
| 40 | 41 | 42 | 43 | 44 | 45 | 46 | 47 | 48 | 49 | 50 | 51 | 52 | 53 | 54 | 55 | 56 | 57 | 58 | 59 |
| 60 | 61 | 62 | 63 | 64 | 65 | 66 | 67 | 68 | 69 | 70 | 71 | 72 | 73 | 74 | 75 | 76 | 77 | 78 | 79 |
| 80 | 81 | 82 | 83 | 84 | 85 | 86 | 87 | 88 | 89 | 90 | 91 | 92 | 93 | 94 | 95 | 96 | 97 | 98 | 99 |
| 100 | 101 | 102 | 103 | 104 | 105 | 106 | 107 | 108 | 109 | 110 | 111 | 112 | 113 | 114 | 115 | 116 | 117 | 118 | 119 |
| 120 | 121 | 122 | 123 | 124 | 125 | 126 | 127 | 128 | 129 | 130 | 131 | 132 | 133 | 134 | 135 | 136 | 137 | 138 | 139 |
| 140 | 141 | 142 | 143 | 144 | 145 | 146 | 147 | 148 | 149 | 150 | 151 | 152 | 153 | 154 | 155 | 156 | 157 | 158 | 159 |
| 160 | 161 | 162 | 163 | 164 | 165 | 166 | 167 | 168 | 169 | 170 | 171 | 172 | 173 | 174 | 175 | 176 | 177 | 178 | 179 |
| 180 | 181 | 182 | 183 | 184 | 185 | 186 | 187 | 188 | 189 | 190 | 191 | 192 | 193 | 194 | 195 | 196 | 197 | 198 | 199 |
| 200 | 201 | 202 | 203 | 204 | 205 | 206 | 207 | 208 | 209 | 210 | 211 | 212 | 213 | 214 | 215 | 216 | 217 | 218 | 219 |
| 220 | 221 | 222 | 223 | 224 | 225 | 226 | 227 | 228 | 229 | 230 | 231 | 232 | 233 | 234 | 235 | 236 | 237 | 238 | 239 |
| 240 | 241 | 242 | 243 | 244 | 245 | 246 | 247 | 248 | 249 | 250 | 251 | 252 | 253 | 254 | 255 | 256 | 257 | 258 | 259 |
| 260 | 261 | 262 | 263 | 264 | 265 | 266 | 267 | 268 | 269 | 270 | 271 | 272 | 273 | 274 | 275 | 276 | 277 | 278 | 279 |
| 280 | 281 | 282 | 283 | 284 | 285 | 286 | 287 | 288 | 289 | 290 | 291 | 292 | 293 | 294 | 295 | 296 | 297 | 298 | 299 |
| 300 | 301 | 302 | 303 | 304 | 305 | 306 | 307 | 308 | 309 | 310 | 311 | 312 | 313 | 314 | 315 | 316 | 317 | 318 | 319 |
| 320 | 321 | 322 | 323 | 324 | 325 | 326 | 327 | 328 | 329 | 330 | 331 | 332 | 333 | 334 | 335 | 336 | 337 | 338 | 339 |
| 340 | 341 | 342 | 343 | 344 | 345 | 346 | 347 | 348 | 349 | 350 | 351 | 352 | 353 | 354 | 355 | 356 | 357 | 358 | 359 |
| 360 | 361 | 362 | 363 | 364 | 365 | 366 | 367 | 368 | 369 | 370 | 371 | 372 | 373 | 374 | 375 | 376 | 377 | 378 | 379 |
| 380 | 381 | 382 | 383 | 384 | 385 | 386 | 387 | 388 | 389 | 390 | 391 | 392 | 393 | 394 | 395 | 396 | 397 | 398 | 399 |
| 400 | 401 | 402 | 403 | 404 | 405 | 406 | 407 | 408 | 409 | 410 | 411 | 412 | 413 | 414 | 415 | 416 | 417 | 418 | 419 |

Fig. 3

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|----|----|----|----|----|----|----|----|----|----|
| 20 | 21 | 22 | 23 | 24 | 25 | 26 | 27 | 28 | 29 | 30 | 31 | 32 | 33 | 34 | 35 | 36 | 37 | 38 | 39 |
| 40 | 41 | 42 | 43 | 44 | 45 | 46 | 47 | 48 | 49 | 50 | 51 | 52 | 53 | 54 | 55 | 56 | 57 | 58 | 59 |
| 60 | 61 | 62 | 63 | 64 | 65 | 66 | 67 | 68 | 69 | 70 | 71 | 72 | 73 | 74 | 75 | 76 | 77 | 78 | 79 |
| 80 | 81 | 82 | 83 | 84 | 85 | 86 | 87 | 88 | 89 | 90 | 91 | 92 | 93 | 94 | 95 | 96 | 97 | 98 | 99 |
| 100 | 101 | 102 | 103 | 104 | 105 | 106 | 107 | 108 | 109 | 110 | 111 | 112 | 113 | 114 | 115 | 116 | 117 | 118 | 119 |
| 120 | 121 | 122 | 123 | 124 | 125 | 126 | 127 | 128 | 129 | 130 | 131 | 132 | 133 | 134 | 135 | 136 | 137 | 138 | 139 |
| 140 | 141 | 142 | 143 | 144 | 145 | 146 | 147 | 148 | 149 | 150 | 151 | 152 | 153 | 154 | 155 | 156 | 157 | 158 | 159 |
| 160 | 161 | 162 | 163 | 164 | 165 | 166 | 167 | 168 | 169 | 170 | 171 | 172 | 173 | 174 | 175 | 176 | 177 | 178 | 179 |
| 180 | 181 | 182 | 183 | 184 | 185 | 186 | 187 | 188 | 189 | 190 | 191 | 192 | 193 | 194 | 195 | 196 | 197 | 198 | 199 |
| 200 | 201 | 202 | 203 | 204 | 205 | 206 | 207 | 208 | 209 | 210 | 211 | 212 | 213 | 214 | 215 | 216 | 217 | 218 | 219 |
| 220 | 221 | 222 | 223 | 224 | 225 | 226 | 227 | 228 | 229 | 230 | 231 | 232 | 233 | 234 | 235 | 236 | 237 | 238 | 239 |
| 240 | 241 | 242 | 243 | 244 | 245 | 246 | 247 | 248 | 249 | 250 | 251 | 252 | 253 | 254 | 255 | 256 | 257 | 258 | 259 |
| 260 | 261 | 262 | 263 | 264 | 265 | 266 | 267 | 268 | 269 | 270 | 271 | 272 | 273 | 274 | 275 | 276 | 277 | 278 | 279 |
| 280 | 281 | 282 | 283 | 284 | 285 | 286 | 287 | 288 | 289 | 290 | 291 | 292 | 293 | 294 | 295 | 296 | 297 | 298 | 299 |
| 300 | 301 | 302 | 303 | 304 | 305 | 306 | 307 | 308 | 309 | 310 | 311 | 312 | 313 | 314 | 315 | 316 | 317 | 318 | 319 |
| 320 | 321 | 322 | 323 | 324 | 325 | 326 | 327 | 328 | 329 | 330 | 331 | 332 | 333 | 334 | 335 | 336 | 337 | 338 | 339 |
| 340 | 341 | 342 | 343 | 344 | 345 | 346 | 347 | 348 | 349 | 350 | 351 | 352 | 353 | 354 | 355 | 356 | 357 | 358 | 359 |
| 360 | 361 | 362 | 363 | 364 | 365 | 366 | 367 | 368 | 369 | 370 | 371 | 372 | 373 | 374 | 375 | 376 | 377 | 378 | 379 |
| 380 | 381 | 382 | 383 | 384 | 385 | 386 | 387 | 388 | 389 | 390 | 391 | 392 | 393 | 394 | 395 | 396 | 397 | 398 | 399 |
| 400 | 401 | 402 | 403 | 404 | 405 | 406 | 407 | 408 | 409 | 410 | 411 | 412 | 413 | 414 | 415 | 416 | 417 | 418 | 419 |

Fig. 4

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 20 | 21 | 22 | 23 | 24 | 25 | 26 | 27 | 28 | 29 | 30 | 31 | 32 | 33 | 34 | 35 | 36 | 37 | 38 | 39 |
| 40 | 41 | 42 | 43 | 44 | 45 | 46 | 47 | 48 | 49 | 50 | 51 | 52 | 53 | 54 | 55 | 56 | 57 | 58 | 59 |
| 60 | 61 | 62 | 63 | 64 | 65 | 66 | 67 | 68 | 69 | 70 | 71 | 72 | 73 | 74 | 75 | 76 | 77 | 78 | 79 |
| 80 | 81 | 82 | 83 | 84 | 85 | 86 | 87 | 88 | 89 | 90 | 91 | 92 | 93 | 94 | 95 | 96 | 97 | 98 | 99 |
| 100 | 101 | 102 | 103 | 104 | 105 | 106 | 107 | 108 | 109 | 110 | 111 | 112 | 113 | 114 | 115 | 116 | 117 | 118 | 119 |
| 120 | 121 | 122 | 123 | 124 | 125 | 126 | 127 | 128 | 129 | 130 | 131 | 132 | 133 | 134 | 135 | 136 | 137 | 138 | 139 |
| 140 | 141 | 142 | 143 | 144 | 145 | 146 | 147 | 148 | 149 | 150 | 151 | 152 | 153 | 154 | 155 | 156 | 157 | 158 | 159 |
| 160 | 161 | 162 | 163 | 164 | 165 | 166 | 167 | 168 | 169 | 170 | 171 | 172 | 173 | 174 | 175 | 176 | 177 | 178 | 179 |
| 180 | 181 | 182 | 183 | 184 | 185 | 186 | 187 | 188 | 189 | 190 | 191 | 192 | 193 | 194 | 195 | 196 | 197 | 198 | 199 |
| 200 | 201 | 202 | 203 | 204 | 205 | 206 | 207 | 208 | 209 | 210 | 211 | 212 | 213 | 214 | 215 | 216 | 217 | 218 | 219 |
| 220 | 221 | 222 | 223 | 224 | 225 | 226 | 227 | 228 | 229 | 230 | 231 | 232 | 233 | 234 | 235 | 236 | 237 | 238 | 239 |
| 240 | 241 | 242 | 243 | 244 | 245 | 246 | 247 | 248 | 249 | 250 | 251 | 252 | 253 | 254 | 255 | 256 | 257 | 258 | 259 |
| 260 | 261 | 262 | 263 | 264 | 265 | 266 | 267 | 268 | 269 | 270 | 271 | 272 | 273 | 274 | 275 | 276 | 277 | 278 | 279 |
| 280 | 281 | 282 | 283 | 284 | 285 | 286 | 287 | 288 | 289 | 290 | 291 | 292 | 293 | 294 | 295 | 296 | 297 | 298 | 299 |
| 300 | 301 | 302 | 303 | 304 | 305 | 306 | 307 | 308 | 309 | 310 | 311 | 312 | 313 | 314 | 315 | 316 | 317 | 318 | 319 |
| 320 | 321 | 322 | 323 | 324 | 325 | 326 | 327 | 328 | 329 | 330 | 331 | 332 | 333 | 334 | 335 | 336 | 337 | 338 | 339 |
| 340 | 341 | 342 | 343 | 344 | 345 | 346 | 347 | 348 | 349 | 350 | 351 | 352 | 353 | 354 | 355 | 356 | 357 | 358 | 359 |
| 360 | 361 | 362 | 363 | 364 | 365 | 366 | 367 | 368 | 369 | 370 | 371 | 372 | 373 | 374 | 375 | 376 | 377 | 378 | 379 |
| 380 | 381 | 382 | 383 | 384 | 385 | 386 | 387 | 388 | 389 | 390 | 391 | 392 | 393 | 394 | 395 | 396 | 397 | 398 | 399 |
| 400 | 401 | 402 | 403 | 404 | 405 | 406 | 407 | 408 | 409 | 410 | 411 | 412 | 413 | 414 | 415 | 416 | 417 | 418 | 419 |

Fig. 5

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 20 | 21 | 22 | 23 | 24 | 25 | 26 | 27 | 28 | 29 | 30 | 31 | 32 | 33 | 34 | 35 | 36 | 37 | 38 | 39 |
| 40 | 41 | 42 | 43 | 44 | 45 | 46 | 47 | 48 | 49 | 50 | 51 | 52 | 53 | 54 | 55 | 56 | 57 | 58 | 59 |
| 60 | 61 | 62 | 63 | 64 | 65 | 66 | 67 | 68 | 69 | 70 | 71 | 72 | 73 | 74 | 75 | 76 | 77 | 78 | 79 |
| 80 | 81 | 82 | 83 | 84 | 85 | 86 | 87 | 88 | 89 | 90 | 91 | 92 | 93 | 94 | 95 | 96 | 97 | 98 | 99 |
| 100 | 101 | 102 | 103 | 104 | 105 | 106 | 107 | 108 | 109 | 110 | 111 | 112 | 113 | 114 | 115 | 116 | 117 | 118 | 119 |
| 120 | 121 | 122 | 123 | 124 | 125 | 126 | 127 | 128 | 129 | 130 | 131 | 132 | 133 | 134 | 135 | 136 | 137 | 138 | 139 |
| 140 | 141 | 142 | 143 | 144 | 145 | 146 | 147 | 148 | 149 | 150 | 151 | 152 | 153 | 154 | 155 | 156 | 157 | 158 | 159 |
| 160 | 161 | 162 | 163 | 164 | 165 | 166 | 167 | 168 | 169 | 170 | 171 | 172 | 173 | 174 | 175 | 176 | 177 | 178 | 179 |
| 180 | 181 | 182 | 183 | 184 | 185 | 186 | 187 | 188 | 189 | 190 | 191 | 192 | 193 | 194 | 195 | 196 | 197 | 198 | 199 |
| 200 | 201 | 202 | 203 | 204 | 205 | 206 | 207 | 208 | 209 | 210 | 211 | 212 | 213 | 214 | 215 | 216 | 217 | 218 | 219 |
| 220 | 221 | 222 | 223 | 224 | 225 | 226 | 227 | 228 | 229 | 230 | 231 | 232 | 233 | 234 | 235 | 236 | 237 | 238 | 239 |
| 240 | 241 | 242 | 243 | 244 | 245 | 246 | 247 | 248 | 249 | 250 | 251 | 252 | 253 | 254 | 255 | 256 | 257 | 258 | 259 |
| 260 | 261 | 262 | 263 | 264 | 265 | 266 | 267 | 268 | 269 | 270 | 271 | 272 | 273 | 274 | 275 | 276 | 277 | 278 | 279 |
| 280 | 281 | 282 | 283 | 284 | 285 | 286 | 287 | 288 | 289 | 290 | 291 | 292 | 293 | 294 | 295 | 296 | 297 | 298 | 299 |
| 300 | 301 | 302 | 303 | 304 | 305 | 306 | 307 | 308 | 309 | 310 | 311 | 312 | 313 | 314 | 315 | 316 | 317 | 318 | 319 |
| 320 | 321 | 322 | 323 | 324 | 325 | 326 | 327 | 328 | 329 | 330 | 331 | 332 | 333 | 334 | 335 | 336 | 337 | 338 | 339 |
| 340 | 341 | 342 | 343 | 344 | 345 | 346 | 347 | 348 | 349 | 350 | 351 | 352 | 353 | 354 | 355 | 356 | 357 | 358 | 359 |
| 360 | 361 | 362 | 363 | 364 | 365 | 366 | 367 | 368 | 369 | 370 | 371 | 372 | 373 | 374 | 375 | 376 | 377 | 378 | 379 |
| 380 | 381 | 382 | 383 | 384 | 385 | 386 | 387 | 388 | 389 | 390 | 391 | 392 | 393 | 394 | 395 | 396 | 397 | 398 | 399 |
| 400 | 401 | 402 | 403 | 404 | 405 | 406 | 407 | 408 | 409 | 410 | 411 | 412 | 413 | 414 | 415 | 416 | 417 | 418 | 419 |

METHOD FOR COMPRESSING AND DECOMPRESSING VIDEO DATA IN ACCORDANCE WITH A PRIORITY ARRAY

BACKGROUND OF THE INVENTION

The invention relates to a method for compressing and decompressing video data.

Videos generate large datasets. To effectively transfer and store these datasets, it is practical to compress them.

According to today's state of the art, video signals are recorded and reproduced in a rapid sequence of individual images. In television (PAL standard) there are 25 images per second, or 50 half-images. With digital recordings there are approximately 30 images per second. Each image is broken down into lines, and transferred first sequentially.

Previous compression methods are based essentially on the reduction of the resolution, of the color depth and the lowering of the number of images per second. With digital compression, e.g. the MPEG method, instead of complete images essentially the differential images, i.e. the differences of the individual image points (pixels) compared to the previous image, are transferred in place of the complete images. The latest standard for video coding is MPEG-4. MPEG is the abbreviation for "Motion Pictures Expert Group". File formats from this group and methods for space-saving compression and storage of video or multimedia data (video, image and sound data) are defined in high quality. The MPEG standard meanwhile is subdivided into MPEG-1, MPEG-2, MPEG-3 and MPEG-4, whereby the MPEG-3 standard has been integrated into MPEG-2.

To be able to process and transport the huge amounts of data from films with "normal" computers, only the changes from the previous image are stored. The MPEG format stores so-called intra-frames at regular intervals of typically twelve images. Intra-frames are JPEG-compressed single images. The images between these I-frames are, if possible, not completely stored. Instead, MPEG stores images in a manner in which one can regain them by shifting parts from preceding or succeeding images. For this purpose "predicted frames" and b-frames (bi-directional frames) are used. However, since this never works perfectly, the remaining deviation per image is additionally stored JPEG-coded. With this method it is possible to reduce the data expenditure for a video film by about 99%. The potential compression goes all the way to 200:1.

MPEG-1 was designed for fluid video playbacks. The MPEG-1 compression or decompression was originally a hardware-dependent method. However, in the meantime, thanks to speedy processors, software decompression is also possible.

The essential difference between MPEG-1 and MPEG-2 consists in the fact that MPEG-2 can work better with interlaced scanning, the method used with television. The secret of MPEG-2 lies in the compression to the highest level of quality, so that film material can be processed and edited almost 1 to 1 in studio quality. Consequently, MPEG-2 established itself as a standard. With a pure 1 frame coding MPEG-2 can even be used in splicing. The part of the MPEG-3 standard that was provided for high definition TV quality (HDTV) had meanwhile been implemented in the MPEG-2 standard.

MPEG-4 is a further development of the MPEG-2 format and has been in development since 1996. Although MPEG-4 was originally intended as a coding standard for audiovisual data with very low bit rates, the development served far more purposes than merely streaming of linear media data with Internet and wireless applications. MPEG-4 for example provides efficient mechanisms for compression and distribution of interactive media contents. Moreover, MPEG-4 has 3-D potentials in order to visualize artificial intelligence or present avatars, e.g. in the course of video conferences. The compression rate with MPEG-4 is higher than with MPEG-2, whereby "sprites" can be compressed better, because the coding mechanism has more time at its disposal for this purpose. In the process it is even possible to switch to wavelets. The scripting language makes it possible in a few bytes to perform operations such as "translation" significantly faster than the digitized compressed form of the same operation would make possible. With the help of these "sprites" it is possible to move any number of contoured still images over moving pictures.

The object of the invention lies in the creation of a method for compressing video data which allows a simple and flexible adaptation to different transfer rates or transmission bandwidth, image resolutions and display sizes.

Advantageous designs and enhancements of the invention are specified in the dependent claims.

SUMMARY OF THE INVENTION

Preferably a parallel processing of the video information occurs in the video recording chip. Parallel processing serves the purpose of first determining the most important pixels and then storing these in a priority array according to the priority allocation. This array contains at each moment in time the pixel values that have been classified according to the priority allocation. The pixels and pixel values that have been used to calculate the priority allocation are transferred or saved according to said priority allocation. A pixel receives a high priority if the differences in relation to its neighboring pixel are great.

For the reconstruction process the current pixel values in each case are reproduced on the display. The pixels that have not yet been transmitted are calculated from the pixels that have already been transmitted.

Different methods can be used for calculating the pixels that have not yet been transmitted, corresponding to the computing power, the transmission bandwidth and the size of the display. If a very large bandwidth is available a simple linear interpolation can be performed. If only a very small bandwidth is available, this fact can be taken into consideration during the transmission of the prioritized pixels.

Objects can be identified by means of the history trend of the transmitting pixels, thus a motion estimate of these objects can be performed.

The basic idea of the method is based on the prioritized storage and/or transmission of pixels. In the storage or video transmission the time and positional (within the image array) dependencies of the individual pixels or pixels combined in pixel groups must further be taken into consideration.

To achieve an extremely high data compression those pixel groups are transmitted which have the highest priority and have not yet been transmitted. The areas, i.e. the pixel values between the already transferred pixel groups are calculated from the pixel groups that have already been transferred, e.g. by means of interpolation. With a higher resolution (larger image array) the attainable compression factor increases, since with natural pictures larger areas usually have a well predictable (uniform) color spread, for example blue sky.

It should also be noted that in each case the exact pixel values are transferred. If necessary, this method allows a loss-free transmission of the video information.

The reproduction or reconstruction of the video data is based on estimates similar to the human visual faculty. Human beings perceives stimuli, but the interpretation of what they recognize on this image takes place in their brain. The stimuli correspond to the transmitted groups of pixels, the interpretation corresponds to the filling in of the areas between the groups of pixels not yet transmitted.

In order to implement this, additional arrays can be created. Among others, this includes an array in which the information is available about which pixel groups the pixel value at the current position was determined from. Further information can be when these values were calculated, from which pixel groups this was calculated or transmitted. Also an estimate about the accuracy of the values (e.g. calculation from directly adjacent pixels, slight variance of the pixels used as a basis for calculation) can be evaluated as additional information.

The described method allows a significantly easier adaptation of the video data stream to different display sizes and image resolutions.

A further advantage is the fact that by means of the described kind of coding of the video there is no automatic setting of which algorithms are used for decoding the video. This is achieved by means of transmitting the prioritized pixel values which, in contrast to other methods, do not experience a mean value formation. Manufacturers thus have the opportunity to develop end devices ranging from low-cost to high end can make themselves stand out from the competitors by means of different algorithms.

The strived for massive parallel processing of the video data in a chip developed especially for this purpose makes it possible to use extremely low clock rates, which has a favorable effect on the power consumption.

By means of prioritization specific areas of the video (e.g. lips on newscasters) can be transferred with a higher priority and consequently with a better resolution.

The method makes it possible to filter out the optimum partial data streams from the data stream of the video for different end devices without having to take this into consideration in the video recording.

BRIEF DESCRIPTION OF THE DRAWINGS

An embodiment of the invention will be described in greater detail using the drawing figures. Further features, advantages and applications of the invention result from the drawings and their description. The figures show the following:

FIG. 3: Image array with moved object at a point in time of t1;
FIG. 4: Image array with moved object at a point in time of t2
FIG. 5: Image array with moved object at a point in time of t3;
FIG. 6: Regenerated image array with inserted pixel groups in the image corner;
FIG. 7: Filling of the areas between the already inserted pixel groups;
FIG. 8: Inserting additional pixel groups and filling in the areas in between.

DETAILED DESCRIPTION

Figures 1, 2:
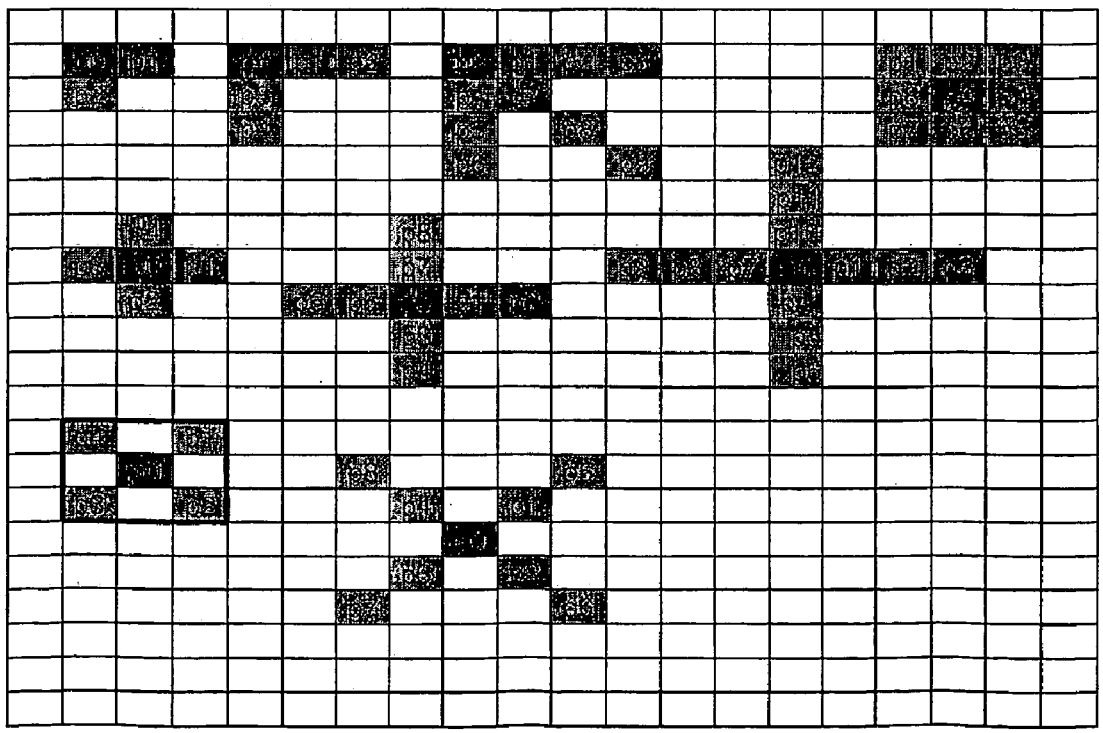
FIG. 1: Representation of an image array of 20×21 pixels.
FIG. 2: Representation of different forms of pixel groups.

In the following the compression and decompression of a video signal is described using an example.

The following assumptions are being made:

A current conventional video signal is available as a video source (e.g. PAL or NTSC). The video information can be read using a conventional electronic device (for example a framegrabber card). To illustrate the method in the following a minimized image array 20 pixels wide and 21 pixels high is used (FIG. 1). Each pixel of the array is represented by a 32 bit value (pixel value). The 32 bits are e.g. divided into 4 values (transparent, red, green, blue) with 8 bits each. The position of the pixels is defined by an integer number. The image array is numbered from 0 to 419 as shown in FIG. 1. The number within each box corresponds to the position of the associated pixel. Between the source and the drain there is a UDP (User Datagram Protocol) connection. The compressed video data are then sent via this connection.

The compression of the video signal occurs in the following way:

The method is based on having a continuous prioritization of the individual pixels of the video signal, whereby the pixels are stored in an array according to their prioritization. This array contains at this moment in time the current pixel values sorted by priority. A pixel receives a high priority if the differences in relation to its neighboring pixel are great. The pixel is combined into a pixel group together with its neighboring pixels used for the calculation. Corresponding to the prioritization these pixel groups are transmitted or stored.

Scanning the Image Array

The framegrabber has at each moment in time the current image in its image array which as in shown in FIG. 1 can be a 20×21 large image array. Each pixel is defined by its position (0 to 419) and its pixel value (color or luminosity value).

Defining Pixel Groups

First, those neighboring pixels which form a pixel group are defined. p0 refers to the pixel that specifies the position of the pixel group and for which the priority is calculated. The relative position of the remaining pixels, e.g. p1–p4, of a pixel group to reference pixel p0 results from the used form of the pixel group. FIG. 2 shows some possible forms of pixel groups. Both symmetrical and asymmetrical pixel groups can be formed in relation to the reference pixel p0. The type of pixel group that is used depends among other things on the type of image material and the compression rate being strived for. As a rule, the more pixels there are included in a pixel group, the bigger the compression factor to be achieved. The same form of pixel groups must be used for coding and decoding, that is, for compressing and decompressing the video image.

Determining Priority Values

The priority in relation to its pixel group is calculated for each pixel p0 of a pixel group. In the process, each pixel from 0 to 419 of the image becomes the reference pixel p0. In accordance with the invention, the calculation of the priority values of the pixels is performed as far as possible within the framework of parallel data processing. It is ideal when the calculation of the priorities of all pixels of the image takes place simultaneously. Because a video signal is involved, the priority values of all pixels are continuously being recalculated, since the image contents are constantly changing. The multitude of pixel groups, in particular those with low prioritization, will with a very high probability, not change.

There can be different computing methods for calculation of the priority. As an example, the linear method is used here.

For this purpose, the individual pixel values P0, P1, P2, P3 and P4 of a pixel group are decomposed into their color percentages of red, green and blue. Each of these color values is represented by 8 bits. For each color of an individual pixel P1–P4 a color difference value in relation to P0 is determined, e.g. P0_red-P1_red, P0_red-P2_red, . . . , P0_blue-P4_blue. The absolute color difference values are added, and divided by the number of colors and the number of the viewed pixels. The result is a priority value for the viewed pixel group. This priority value is higher, the more different the color values of the individual pixels of the pixel group.

Further methods for determining the priority value are using gray shades or the maximum value of the color difference of a color. Since the priority value is not later stored or transmitted itself, the method for determining the priority value has no direct influence on the decoding.

As a result of this prioritization the image areas that have a large color or contrast change, such as edges, receive a high priority, and relatively uniform image contents, such as a blue sky, have a low priority.

Sorting Priority Values

In this step the priority values of the size are sorted in descending order. The sorting takes place after the determination of each new priority value. For each moment in time one thus has a list of pixel groups classified by priorities sorted in descending order. The development of a corresponding image recorder (CCD chips) is to be strived for, which immediately provides such a list classified by priorities. If the image to be compressed is directly recorded using a CCD camera or a scanner, there is the option of receiving an array immediately sorted by priorities from the image processing microchip available in the camera/scanner. Thus a significant part of the computational load in compressing is saved.

Updating the Priority Values

In contrast to still images (e.g. photographs) in video information there is a constantly varying priority change of the pixel groups, e.g. with camera pan or moved objects. To illustrate this, FIGS. 3 through 5 show a video image array at different points in time t1 through t3, whereby an object is moving from right to left.

In accordance with FIG. 2 the image at time point t1 contains an object which fills pixels 156, 157, 176, 177, 191–197, 211–217, 231–237, 256, 257, 276, 277. In FIG. 2 the thickly framed form of the pixel group (bottom left) is used to calculate the priorities of the pixels (0–419) of the image. A priority distribution of the pixels results, as shown in the further description of the method in Table 1 at point in time t1. The table contains only the number of the reference pixel (p0) of a pixel group. Those pixel groups that are located in the marginal area of the object and whose reference pixel (p0) has the greatest difference to the remaining pixels receive the highest priority A. Those pixel groups whose reference pixel has a lesser difference to the remaining pixels of the pixel group receives a medium priority B and those pixel groups whose reference pixel has no difference at all to the remaining pixels of the pixel group have the lowest priority C.

TABLE 1

| | Priority A | Priority B | Priority C |
|---|---|---|---|
| Time point t1 | 175, 255, 231, 191, 156, 157, 277, 276 | 177, 197, 217, 237, 257, 176, 256, 211, 192, . . . | 0, 1, 2, 3, 4, 5, 6, 7, 8, 9, 10, 11, 12, 13, 14, 15, . . . |
| Time point t2 | 189, 173, 154, 155, 274, 275, 253, 229 | 175, 195, 215, 235, 255, 190, 191, 192, 193, . . . | 0, 1, 2, 3, 4, 5, 6, 7, 8, 9, 10, 11, 12, 13, 14, 15, . . . |
| Time point t3 | 187, 171, 227, 251, 152, 153, 272, 273 | 173, 193, 213, 233, 253, 188, 189, 190, 191, . . . | 0, 1, 2, 3, 4, 5, 6, 7, 8, 9, 10, 11, 12, 13, 14, 15, . . . |
| . . . | . . . | . . . | . . . |

During compression those pixel groups with priority A are transmitted or stored first, then those pixel groups with priority B and finally the pixel groups with priority C. Since the object moves in the meantime and in FIGS. 4 and 5 occupies a different position in relation to FIG. 3, the priorities of the individual pixel groups changes. The priority list is updated and it immediately continues with the transmission of the current pixel groups with the highest priority.

The recalculated priorities of the pixel groups for time points t2 (FIG. 4) and t3 (FIG. 5) are shown in Table 1.

Thus a potentially compressed transmission of a video signal in accordance with Table 1 could look like the following:

Time point t1: Pixel groups with the highest priority A are transmitted: 175, 255, 231, 191, 156, 157, 277, 276, 177, 197, 217.

At time point t2 new priorities are detected. Different pixel groups receive the highest priority A. The video signal transmission continues with the transmission of the new priority:

189, 173, 154, 155, 274, 275, 253, 229

After that comes the transmission of the pixel groups with priority B:

175, 195, 215, 235, 255, 190, 191, 192, 193, . . .

At time point t3 new priorities are again detected. Different pixel groups receive the highest priority A. The video signal transmission continues with the transmission of the new priority:

187, 171, 227, 251, 152, 153, 272, 273

In an additional array there is testing to determine which pixel groups have already been transmitted. If a pixel group has already been transmitted, it does not need to be transmitted a $2^{nd}$ time, provided its priority has not changed in the meantime. Specific image regions, e.g. faces, can bet detected and preferentially transmitted. Additionally, the receiver can also request specific pixel groups (e.g. with the detection of transmission errors by means of faulty CRC check) Pixel groups requested in this manner can then receive a higher priority, so that they are transmitted immediately.

Saving/Transmitting Pixel Groups

The terms "save" and "transfer" are used synonymously in the followings. First some parameters of the video image are saved or transmitted. Examples of this are:

image width (in pixels)
image height (in pixels)
used form of the pixel group (not necessary when only one form is standardized)

Then the individual pixel groups are saved or transmitted in accordance with their priority, i.e. pixel groups with higher priority are saved first (and later also read out first).

For this purpose the position value of the reference pixel p0 of the pixel group is saved first. Then the pixel values P0, P1, P2, P3, P4 are saved.

EXAMPLE

Position value P0, pixel values P0, P1, P2, P3, P4, next position value P0 (with the same or lower priority), pixel values P0, P1, P2, P3, P4, . . . , next position value P0 (with lowest priority), pixel values P0, P1, P2, P3, P4.

Saving can be optimized by means of different methods, which are only discussed here as examples. A run-length coding of the pixel groups can be performed. For example, when there are no red percentages in an image area, it can be transmitted with only 2 bits instead of 8 bits (red), or the number of leading zeroes can be utilized. Further, generally conventional compression methods, e.g. zip format, can be employed. By defining a limit for the prioritization, a specific quality can be guaranteed. For example, a threshold can be defined for the pixel difference values, below which the allocated pixel group always receives the lowest priority value.

If the 4 pixel groups of the corner points are transmitted first, one gets the greatest possible area calculated with few pixel groups.

Reconstructing (Decompressing) the Video Data

Generating a New Image Array

In the reconstruction of the compressed video data, first an image array comparable with the representation in FIG. 1 is generated. For this purpose the characteristics of the image are scanned and evaluated. Examples of this are the image width, image height and the form of the pixel group used for compression. If the image height and image width between the original image and the desired display (e.g. limited PDA display or high resolution monitor) do not match, corresponding scaling must take place.

For this purpose conversion factors are first determined (imagewidth_original/imagewidth_display and imageheight_original/imageheight$_{13}$ display). These factors can be used to convert the position value from the original image to the position value of the new display.

Inserting Pixel Groups

As shown in FIG. 6, the pixel groups are now scanned in in accordance with the sequence of the prioritized pixel groups. For example, the first four pixel groups with the highest priority are entered into the image array. In FIG. 6 these are the pixel groups of the corners of the image. The position of the reference pixel p0 of each pixel group is specified by the black fields 21, 38, 381 and 398. This position value (p0) is present as an integer value in the saved file. Then the dark gray pixel values (p1–p4) belonging to each pixel group can be entered in the new image array. The light gray marked pixel values in between can be calculated from the dark gray and black marked fields. For calculation, first the known pixel values are broken down into their components of red, green and blue. Then the mean value of each color value is calculated, e.g. Pixel(22)=(Pixel(2)+Pixel(21)+Pixel(42))/3.

Filling Areas

Figures 7, 8:
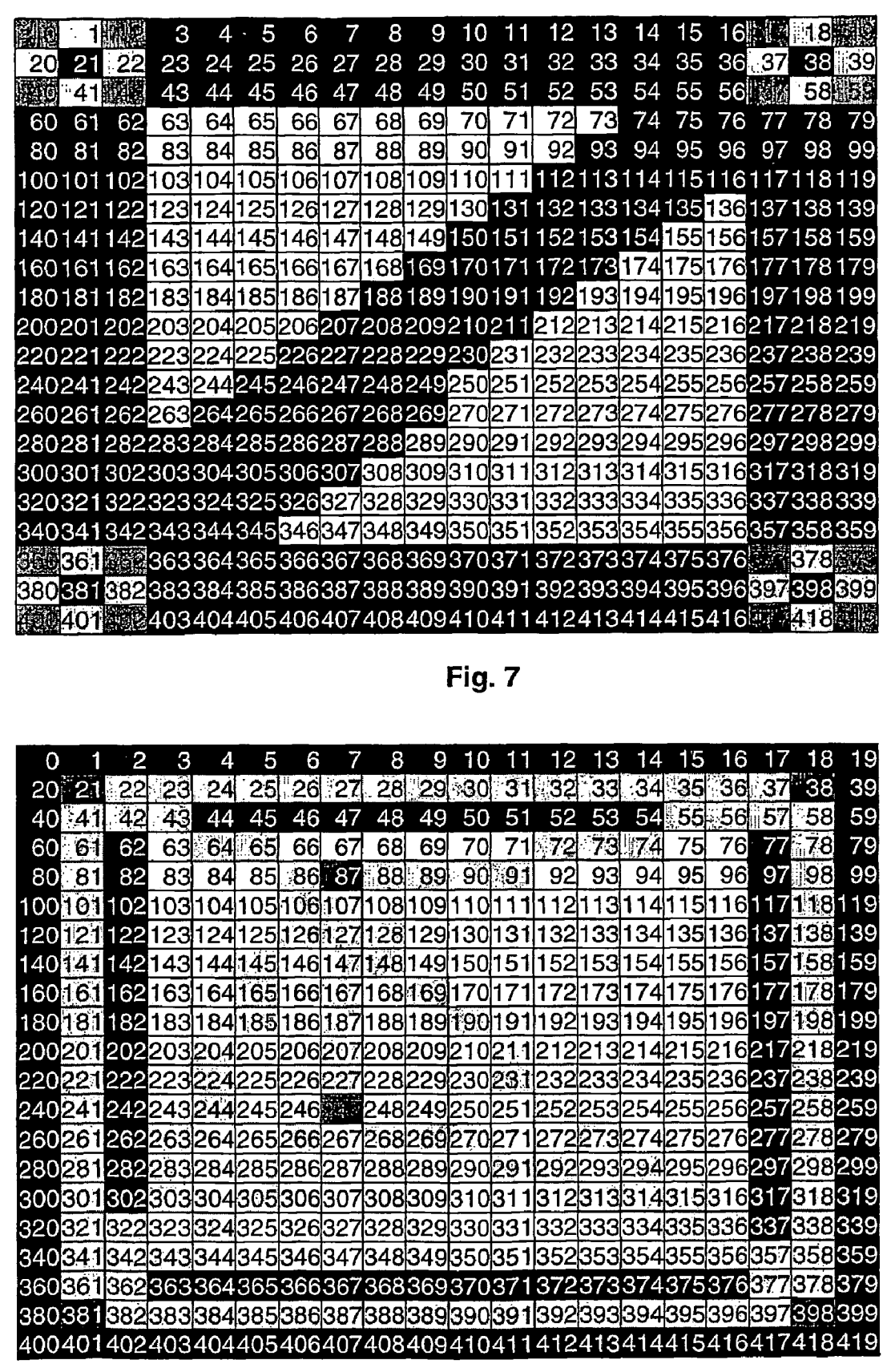

Now the existing pixel groups are connected with each other by means of lines. This process is shown in FIG. 7. Triangles result, whose corners are defined by means of the corresponding pixel groups. This is illustrated at the line between pixel position 2 and pixel position 17. The color spread of the line is calculated using the color values of pixel 2 and pixel 17. First the number of pixels between these two positions is determined, in Example this is 14. Then the color difference for each color (red, green, blue) is determined, e.g. color value at position 2=2; color value at position 17=30 results in the color difference of 28). A color value increase per pixel—from pixel 2 to pixel 17—is then calculated from the color difference/number (in the example 28/14=2).

The remaining areas are filled in by drawing horizontal lines, e.g. from position 63 to position 74, from position 82 to position 93 etc. Here too, a preliminary color spread is calculated between the points as specified above.

As FIG. 8 shows, each additionally added pixel group results in additional triangles that can be filled in correspondingly. After filling in the entire area first using the 4 corner points (21, 38, 398, 381), the resolution can now be refined with each additional pixel group. The addition of the pixel group 87 results in 4 triangles with the reference points (21, 38, 87), (21, 87, 381), 381, 87, 398), (398, 78, 38). If an additional pixel group (247) is inserted within such a triangle, e.g. 87, 381, 398, 3 new triangles result (247, 381, 398), (247, 87, 381) and (247, 87, 398). Each new pixel group thus generates 3 new triangles, which can be filled in. The more pixel groups are inserted, i.e. the more triangles are formed, the closer the calculated color spread comes to the actual color spread of the image. Since from now on only new triangles come into being, optimized methods can be used for the calculations. In addition, the three newly resulting triangles can be calculated parallel to each other, to increase the processing speed. An additional opportunity for parallelization results when new pixel groups are added in different regions of the image.

The above described procedural steps require that the image contents have not changed in the meantime. If the image contents change, then the priorities of the individual pixel groups are redistributed and the current pixel groups with the highest priority are transmitted. Only the sequence of the pixel groups currently being transmitted and inserted into the image changes. However, nothing changes in the above described principle of reconstruction of the image.

To take into account the time changes of the image contents, additional arrays (with the size of the image array) can also be generated. These can contain information about the

- time, i.e. when a pixel value was last calculated or transmitted
- calculation foundation: which transmitted pixels were used to calculate the pixel value
- probability/accuracy. Was a pixel value transmitted or calculated; if it was calculated how great is the variance of the pixel groups from which the new value was calculated?
- deviation of the already calculated pixel values with the transmitting pixel values From these sizes image regions can then be defined in which frequent pixel group changes occur. Neighboring pixel groups, or even complete areas are as a rule subject to similar changes, e.g. luminosity changes, color changes. By evaluating these changes as a rule objects and their dynamic behavior can be specified, e.g. object that moves in the video. Constant changes related to the entire image array can for example refer to a camera pan. If this information is evaluated e.g. with the help of adaptive neural networks, estimates can very easily be made about the pixel values of pixel groups not yet transmitted. If these estimates are correct, pixel groups can be identified that have special influence on changes on objects. If these pixel groups are requested from the source again, it is possible to precisely define and predict object movements with only a few pixel groups. In practice this means that although only a low bandwidth is available, low delay times occur, which are significantly lower than with frame-based methods. The evaluation of the arrays additionally generated in the receiver also allows good object detection.

Depending on the available resources, along with pure prioritization by means of the color values of neighboring pixels, dependencies on the location of the prioritized pixels groups can also be used.

An application will illustrate this. If one views a horizon on the sea, it appears as a horizontal line. It is to be expected that the priority values of each pixel group along this horizon will be about the same. In this case the points of the horizontal line lying furthest from each other have the greatest informative value. By transmitting the outermost left and outermost right pixel groups of the horizon it is possible to reconstruct it again.

A further option of prioritization lies in the height assessment of specified image areas. Such an image area can for example be faces. Although faces on vacation videos sometimes only make up a small percentage area of the entire image, they are usually the center of attention in viewing. Such human viewing behavior can be taken into consideration by means of appropriate prioritizing of the pixel groups of these image areas (face areas). The pixel groups in the center of the video can also experience a correspondingly higher prioritization.

An additional option of optimizing lies in the fact that neighboring pixel groups overlay each other. By means of skillful selection of the pixel groups it is possible to avoid having overlaying pixel values of neighboring pixel groups transmitted repeatedly.

The expenditure used for decoding is freely scalable. In smaller displays (e.g. cell phones), certainly less computational load is necessary than is the case with reproduction on a high resolution large screen, although both use the same source data stream, consisting of the prioritized pixel groups. This flexible scaling makes it possible for manufacturers of end devices to incorporate special optimizations, e.g. number of objects, history of the image changes, into their devices. This gives manufactures the opportunity to make themselves stand out from their competitors, without jeopardizing the compatibility of the video transmission.

The invention claimed is:

1. A method for compressing video data consisting of individual picture points (pixels), whereby each pixel has a changing pixel value which describes the color or luminosity information of the pixel, comprising the following steps:
    a) determination of a priority value for each pixel of an array by calculating a pixel difference value using the current pixel value of the pixel with reference to the current pixel values of a previously defined group of neighboring pixels;
    b) combining the pixels used for the calculation of the priority value into a pixel group,
    c) sorting the pixel groups using their priority value and storing them in a priority array; and
    d) saving and/or transmitting the pixel groups according to their priority in the priority array, whereby steps a) through d) are continuously repeated, whereby the priority values of the pixel groups are constantly being redetermined and the priority at each point in time contains the pixel groups sorted by current priorities.

2. The method according to claim 1, wherein the pixel difference results from the difference of the pixel value of a viewed pixel to the pixel value of each of its neighboring pixels of the pixel group.

3. The method according to claim 1, wherein at the beginning the parameters of a video image, such as image width in pixels, image height in pixels and form of a used pixel group are saved and/or transmitted.

4. The method according to claim 1, wherein for each pixel group the position of a reference pixel, its pixel value, as well as the pixel value of all remaining pixels is saved or transmitted.

5. The method according to claim 1, wherein pixel groups of specific image regions are allocated an increased priority.

6. The method according to claim 1, wherein the pixel values of the pixel groups are further compressed by run length encoding or other compression methods.

7. The method according to claim 1, wherein the constant determination and output of the pixel groups sorted by priority occurs by means of image recording system, such as scanner, CCD camera etc.

8. The method according to claim 1, wherein framegrabber cards (or software solutions) can be used in order to convert video material of most various formats (e.g. AVI, MPEG-1, MPEG-2, MPEG-3, MPEG-4, . . . ).

9. The method for reconstructing video data that has been compressed with the method according to claim 1, wherein the pixel values scanned in are represented in the form of an image array, whereby the pixels not yet transmitted are calculated from the pixels that have already been transmitted.

10. The method according to claim 9, and further comprising:
    a) generation of an empty image array from the scanned parameters of a compressed video image,
    b) continuous scanning of the saved or transmitted pixel groups and insertion into the image array,
    c) forming of triangles by means of connecting three immediately neighboring pixel groups through at least one line,
    d) filling in the area of the pixels forming the triangles using a color spread and/or luminosity spread calculated from the pixel groups forming the triangle
    e) repetition of steps b) through e).

11. The method according to claim 10, wherein the triangles are scalable in size and can be adapted to various image resolutions.

12. The method according to claim 10, wherein additional arrays are generated, comprising arrays which contain information about the:
    time, i.e. when a pixel value was last calculated or transmitted
    calculation foundation: i.e. which transmitted pixels were used to calculate the pixel value
    probability/accuracy, i.e., was a pixel value transmitted or calculated; if it was calculated how great is the variance of the pixel groups from which a new value was calculated?
    deviation of the already calculated pixel values with the transmitting pixel values.

13. The method according to claim 12, and using the array generated by claim 12 to detect motion profiles and objects.

14. The method according to claim 13, wherein by means of evaluation of the motion profile and objects fluid motions with extremely low latent times are achieved in spite of low transmission rates.

* * * * *

UNITED STATES PATENT AND TRADEMARK OFFICE
CERTIFICATE OF CORRECTION

| | | |
|---|---|---|
| PATENT NO. | : 7,130,347 B2 | Page 1 of 1 |
| APPLICATION NO. | : 10/472539 | |
| DATED | : October 31, 2006 | |
| INVENTOR(S) | : Gerd Mossakowski | |

It is certified that error appears in the above-identified patent and that said Letters Patent is hereby corrected as shown below:

Claim 7, Column 10, Line 20: after "of" insert --an--

Signed and Sealed this

Thirteenth Day of February, 2007

JON W. DUDAS
*Director of the United States Patent and Trademark Office*